United States Patent [19]

Tanner

[11] 4,149,748

[45] Apr. 17, 1979

[54] MOBILE HOUSE

[76] Inventor: Barry A. Tanner, Tumbleweeds, Broombarn La., Great Missenden, Buckinghamshire, England

[21] Appl. No.: 763,686

[22] Filed: Jan. 12, 1977

[30] Foreign Application Priority Data

Jan. 15, 1976 [GB] United Kingdom ............... 1617/76

[51] Int. Cl.² .............................................. B60P 3/32
[52] U.S. Cl. ................................... 296/168; 280/789
[58] Field of Search ............ 296/28 R, 23 MC, 23 R; 280/106 T; 135/1 A, 3 A, 5 A, 7.1 A

[56] References Cited

U.S. PATENT DOCUMENTS

| | | | |
|---|---|---|---|
| 2,786,710 | 3/1957 | Chapman | 296/23 R |
| 3,095,231 | 6/1963 | Reed | 296/23 R |
| 3,284,128 | 11/1966 | Alarie | 296/23 R |
| 3,288,516 | 11/1966 | Lewis | 296/23 R |
| 3,701,510 | 10/1972 | Logan | 296/23 MC |
| 3,806,147 | 4/1974 | Hanson | 296/23 R |
| 3,877,187 | 4/1975 | Livingston | 296/23 R |
| 3,923,335 | 12/1975 | Erickson | 296/23 R |
| 4,035,015 | 7/1977 | Smith | 280/106 T |

*Primary Examiner*—Joseph F. Peters, Jr.
*Assistant Examiner*—John A. Carroll
*Attorney, Agent, or Firm*—Haseltine, Lake & Waters

[57] ABSTRACT

A towable caravan consists of a body which can be demounted from the trailer on which it is towed, and can then be mounted on legs to function as a stationary accommodation unit. The trailer is specially adapted so that when it is removed from under the caravan body a frame tent can be pitched upon its upper surface, which has a floor, to provide a second accommodation unit with the advantage over a conventional tent that it has a flat floor raised off the ground. Provided with the caravan are the tent, legs for the caravan body and jacks for lifting the body off the trailer.

4 Claims, 12 Drawing Figures

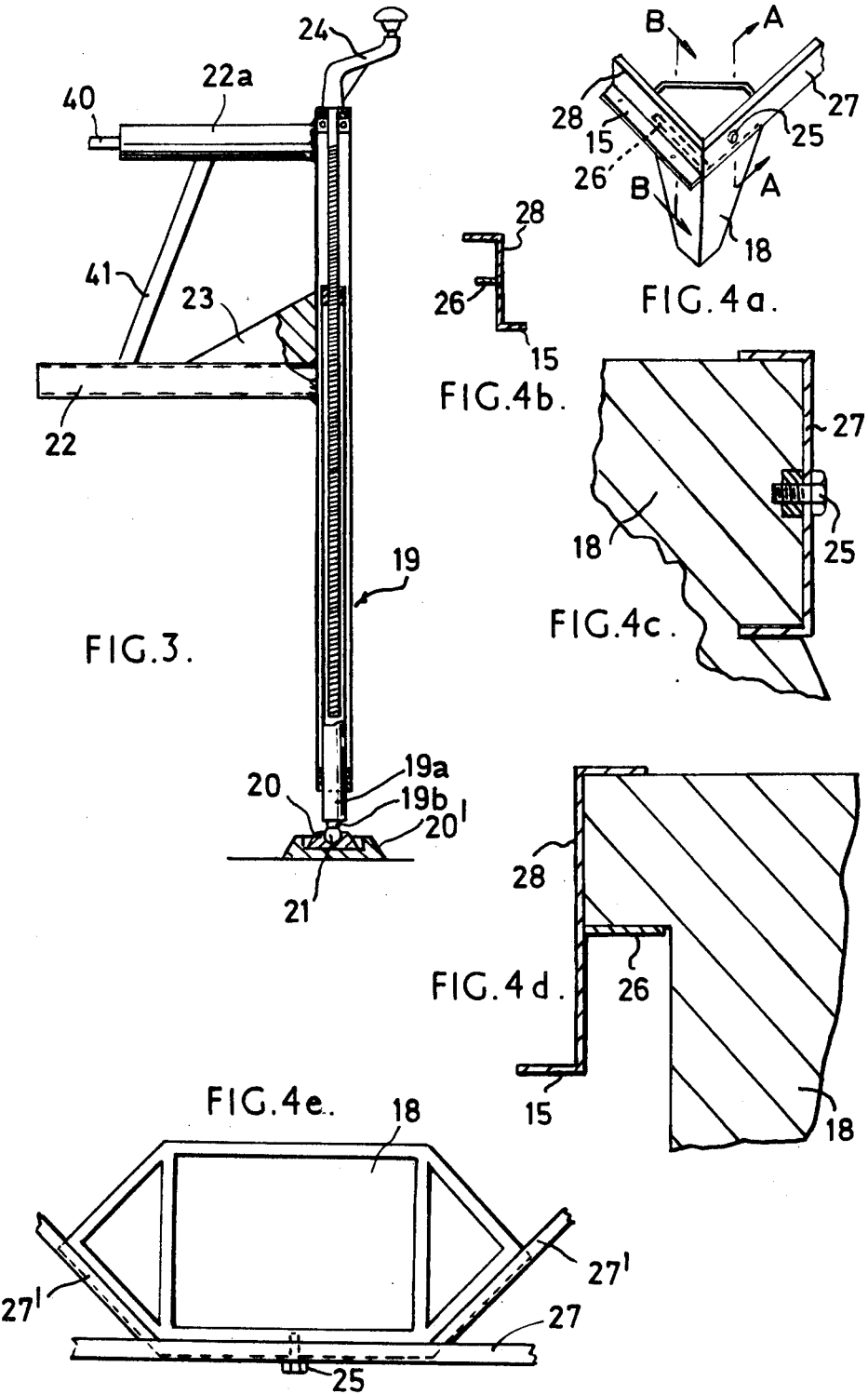

MOBILE HOUSE

This invention relates to a caravan in which the caravan body is demountable from its chassis, and to a combination of that caravan with a tent.

According to the invention, there is provided a camping set comprising a caravan body unit with an integral floor, a towable trailer unit having a floor on its upper surface adapted to receive the body unit thereon, legs for supporting the caravan body when it has been demounted from the trailer, a frame tent, and means on the trailer unit for supporting the frame of the tent, when erected.

The use of this construction can double the space available for camping/caravanning. The body unit retains all its accommodation when demounted from the trailer base or chassis, and the tent erected on the trailer base provides additional space for accommodation etc. together with a dry floor mounted off the ground.

The invention also comprises a camping set wherein the body unit has flanges which locate over corresponding flanges on the trailer unit when the two are fitted together, and the flanges of the body unit are fixed to the flanges of the trailer unit to secure the two units together.

The body unit is preferably demounted by first raising it off the trailer unit by means of a jack at each corner, and then pulling the trailer unit out from under the body unit. A leg is then attached to each corner of the body unit, and the jacks are lowered until the legs rest on the ground. The jacks can then be removed. To remount the body unit, this sequence of operations is reversed.

The integral floor of the body unit must be suitably braced to support loads inside the unit when it is demounted. If necessary, e.g. for longer caravans, extra legs can be fitted along the sides of the unit. However it will normally always be possible to demount the body using only four jacks.

The floor on the trailer unit may be covered with nylon felt, or have some other covering, which is preferably water-resistant, to make it comfortable and attractive as a floor to the tent. Sockets for receiving upright poles of the tent may be provided around the edge of this floor. These sockets need be only e.g. 2 inches deep if the poles are a close fit in them. The sockets can also support shallow side walls, so that the trailer base could be converted to a trailer for purposes other than camping.

The trailer unit preferably supports one or more gas bottles while the caravan is being towed. These may be demountable, so that they can service both the tent and the caravan body unit.

The trailer floor may also have locating means, e.g. sockets, onto which a wash basin, vanity set and toilet for example may be mounted. A shower well could be moulded into the floor. The portable toilet, wash basin etc. would have to be removed from the locating means when the body unit is replaced on the trailer unit and would then be stowed away in the body unit itself when the outfit is being towed.

When the body unit is mounted on the trailer unit, the two must be secured together for towing. This can be done with a small number of bolts at the two ends of the caravan. In a preferable construction, the body unit and trailer unit have corresponding flanges at their two ends. When the body unit is in position on the trailer unit, these flanges lie parallel with one on top of the other, and bolts can be passed through the holes in both, and nuts screwed onto the bolts to secure them.

The legs of the body unit are preferably molded, and arranged to cooperate with flanges on the underside of the body unit floor so that they can be held rigidly in place by a single bolt. To improve the rigidity of the unit when standing on its legs, the legs preferably splay out from the unit floor at the sides.

The invention will now be further described, by way of example, with reference to the accompanying drawings, in which:

FIG. 3 is a detailed drawing of a jack suitable for use in demounting the body unit;

Figure 2:
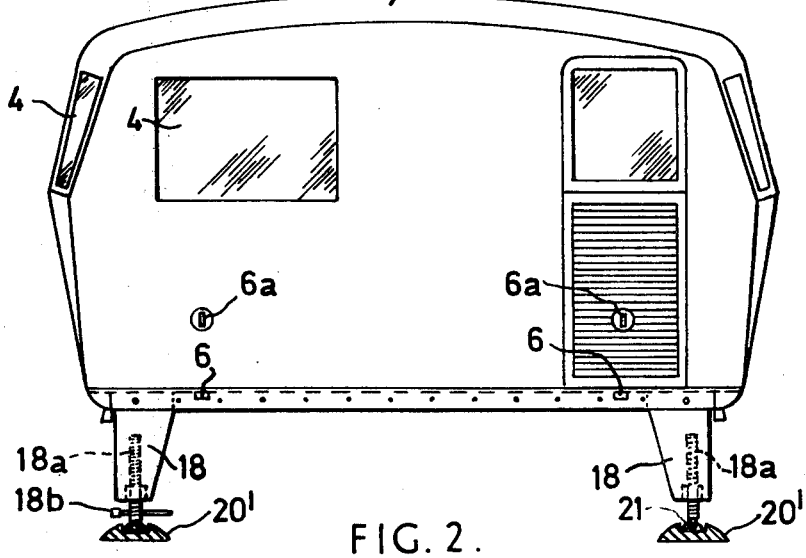
FIG. 2 is an elevation showing the body unit of FIG. 1 demounted from the trailer unit.
Figure 5:
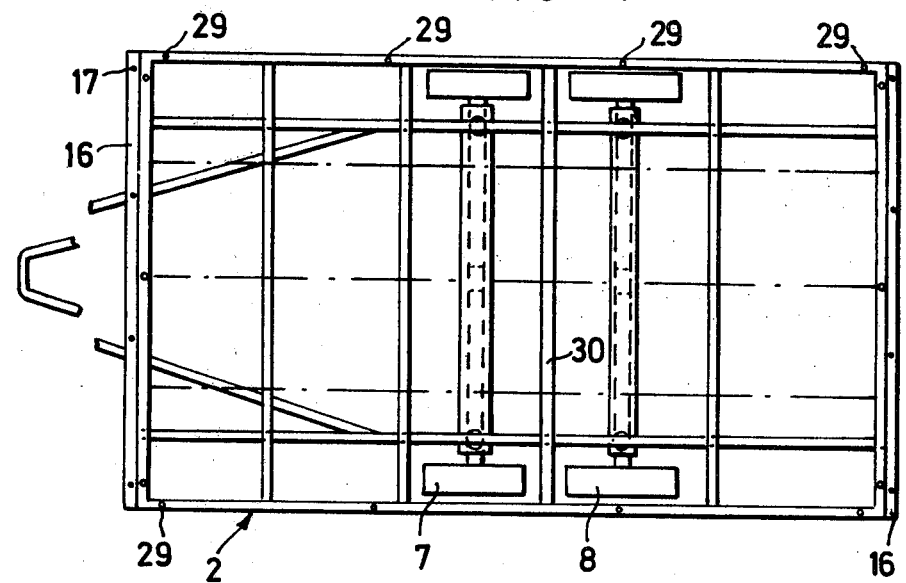
Figure 6:
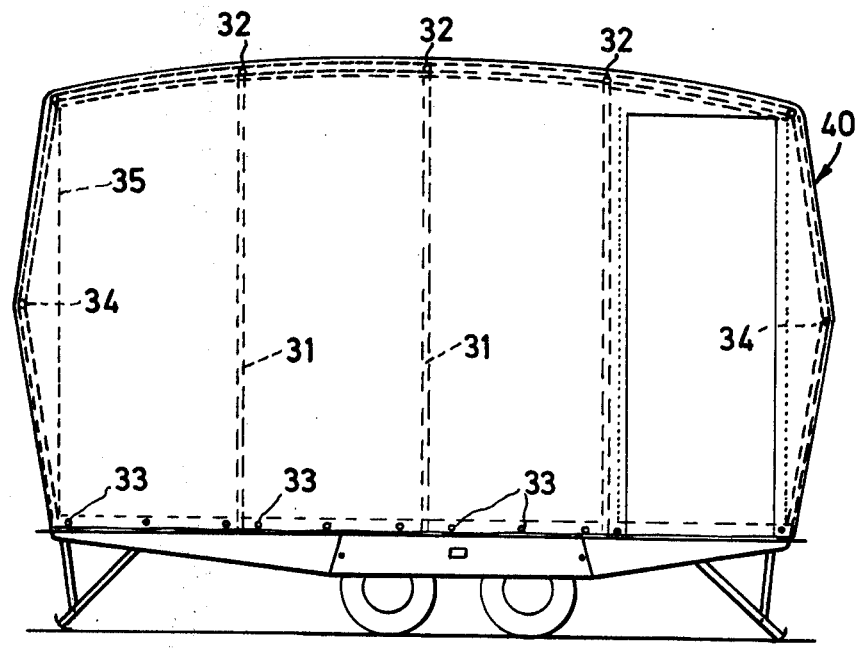

FIGS. 4a, b, c, d, e, show details of the mounting of the legs of the body unit shown in FIG. 2;

FIG. 5 is a plan view of the trailer unit of a caravan according to the invention, with the floor removed; and FIG. 6 is an elevation showing a tent erected on the trailer unit of FIG. 5.

Figure 1:
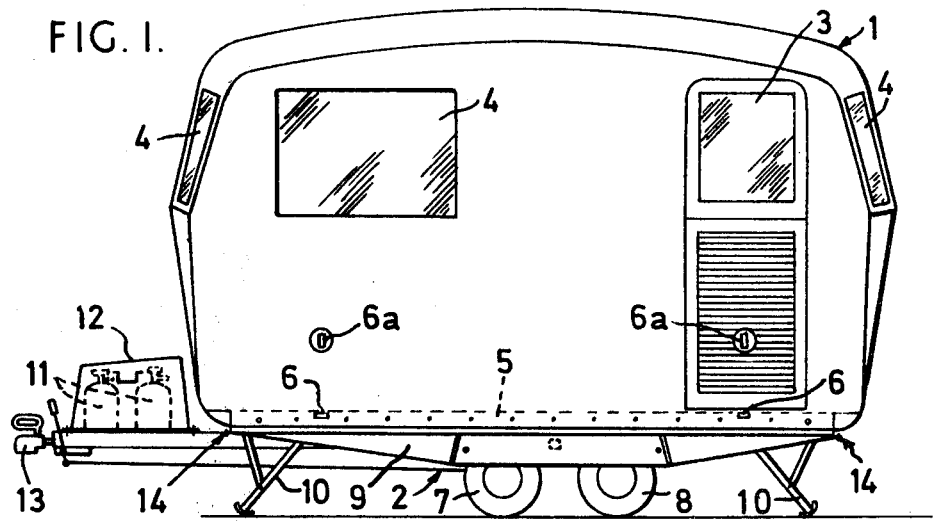
FIG. 1 is an elevation of a caravan according to the invention.

The complete caravan shown in FIG. 1 consists of a body unit 1 and a trailer unit 2. The body unit is, for the most part, of conventional construction and has a door 3 and windows 4. The body could be conventionally constructed of aluminium with a timber frame, or could alternatively be of glass reinforced plastics. The bottom edge of the body unit 1 includes a floor supporting structure or sub-frame 5, and recesses 6 are provided in this structure to receive jacks. It is not essential to have a sub-frame for the body unit. A glass reinforced plastic molding could be used instead, but there will still have to be recesses 6 for the jacks.

The trailer unit 2 is also to a large extent conventional. Two wheels 7 and two wheels 8 are provided, and in this construction these wheels would normally be completely underneath the caravan unit 1. A glass fibre panel 9 is mounted along each side of the trailer unit to improve its appearance. Screw-down stays 10 are provided at both ends of the trailer to stabilise this in a conventional manner. Two gas bottles 11 are mounted inside a demountable glass fibre container 12 on the forwardly projecting part of the trailer. A conventional towing hitch 13 is also provided.

Figures 1A, 1B:
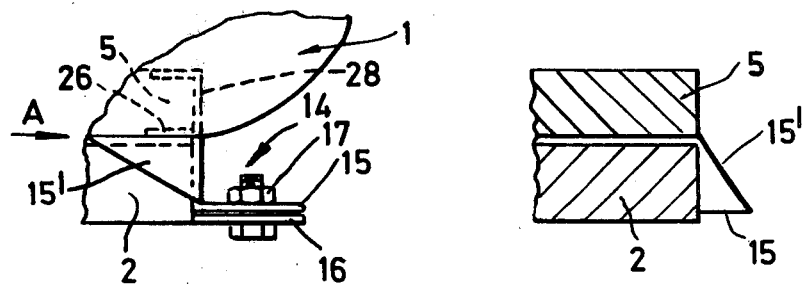
FIG. 1a is a detail of part of FIG. 1.
FIG. 1b is a view of the detail shown in FIG. 1a looking in the direction of arrow A.

The body unit and trailer unit are connected by means of bolts among the front and rear edges of the joint between them. These two locations are indicated at 14, and a detail of one of them is shown in FIG. 1a. It will be seen that both the trailer unit 2 and the sub-frame 5 of the body unit have flanges 15, 16, and these two flanges have corresponding holes which can be lined up and then the flanges connected by means of a nut and bolt 17 passing through the corresponding holes. To help to centre the body unit when remounting, angled triangular side fillets 15′ are mounted on the sub-frame 5, as shown in FIG. 1b.

The body unit is demounted from the trailer unit using the following procedure. Four jacks, which may be of the type shown in FIG. 3, and which are provided with the caravan, have their horizontal members 22 inserted into the recesses 6. At this stage, the trailer unit 2 can still be coupled to the car, but on the otherhand it can be uncoupled and the trailer unit moved manually. The jacks are then operated to lift the body unit, preferably to a height about 12 inches above the trailer unit. The trailer unit is then pulled or towed out from underneath. Since the wheels 7 and 8 are completely underneath the trailer unit, they will not tend to knock the jacks over or otherwide get in the way. Once the trailer 2 is clear of the body unit, legs 18 (see FIG. 2) are attached to the four corners of the body unit. The jacks are then lowered until the legs 18 bear on the ground and support the body unit. The jacks can then be removed and stored until it is desired to remount the body unit on the trailer.

Although not specifically shown in the drawings, the legs 18 extend sideways out from underneath the body unit base when this is viewed from either end, but extend merely directly downwards when the body unit is viewed from the side. The splaying-out adds to the stability of the unit, but it is not so necessary in the opposite plane. The jacks 19 are mounted a distance out from the body unit base so as to facilitate maneuvering of the trailer unit.

A typical jack 19 is shown in FIG. 3. This has a swivel foot 20, of the type used for furniture, connected to the jack stem by means of a ball and socket joint 21. A large diameter flat shoe 20' is placed under the foot 20 to spread the load. This allows the jack to be used successfully on soft or uneven ground. The horizontal arm 22 is formed from tubular material, and since it has to operate at a distance from the load to be jacked, a bracing plate 23 may be welded between the horizontal and vertical members. The jack is operated by a handle 24 which rotates a threaded rod passing through a threaded bush. As a modification, this jack can have an additional hollow section square tube 19b inside tube 19a. This tube 19b would then be attached to the foot 20 via the universal ball joint 21. The tube 19a would have two or three ⅜" diameter holes drilled through two opposing sides and tube 19b would have corresponding holes, to line up with these holes, drilled at 2" intervals along its entire length, so that a very quick extension in working height can be achieved, simply by passing a locating pin through appropriate sets of holes.

A second horizontal arm 22a is mounted above arm 22. When the body unit is supported only by the jacks 19, it is liable to be unstable. To keep the jacks vertical, pin 40 engages in a recess 6a in the side of the body unit so that neither the body 1 nor the jack 19 can pivot about arm 22. The recess 6a in the side of the body is preferably vertically elongated. A support member 41 strengthens the arm 22a.

Details of the molded legs for the body unit are shown in FIG. 4. The construction of these legs is such that only one bolt 25 is needed to fix the legs rigidly in place. This one bolt screws into a nut molded into the leg itself, and for this reason both left and right-handed corner legs are necessary. FIG. 4b shows a welded-in flange 26 which is provided just at the corners of the structure 5, and lies opposite to the flange 15 shown in FIG. 1a. FIGS. 4c and 4d are respectively sections on the lines A—A, B—B of FIG. 4a. As will be seen from FIG. 4c, the channel section 27 has top and bottom flanges which co-operate both with the top, and with a recess in the glass reinforced plastic leg, while the channel section 28 (FIG. 4d) has a top flange and a bottom flange 26. For a long caravan, it may be necessary to have one or more legs spaced along each side. In order to permit these to be attached by a single bolt, extra channel sections 27' are provided at 45° to the main section 27 (FIG. 4e). The leg has three sides shaped to fit in between these sections and to be pulled up against them, to form a rigid connection, by a single bolt 25.

At the base of these legs a self-levelling pad, of the same type as used for the jacks 19, could be incorporated to cope with any unevenness of the ground (see FIG. 2). The same shoes 20' could be used under feet 20. Only six shoes 20' would be needed, because once one end of the body has been lowered onto its legs, the shoes from the out of use pair of jacks would be available. A tommy-bar 18b can be used to raise or lower the legs 18 on threaded rods 18a, as shown.

The trailer unit 2 shown in plan view in FIG. 5 has had its floor removed, so as to show the structure underneath the floor. The floor may be a continuous covering of ⅜ inch exterior grade plywood, and may have a flush fitting felt carpet. As an alternative, the floor can be a glass reinforced plastic molding. The flanges 16, and position of nuts and bolts 17 are clearly shown. There are four nuts and bolts at each end. Along the four edges of the trailer unit 2, there are tent frame base support sockets 29. These are tubes 2 inches deep with blanked off ends, and they are built into the main trailer frame surround. A jacking socket is provided on either side of the trailer unit 2 in the central beam 30 of the structure. When the glass reinforced plastic panel 9 is fitted, this socket is obscured, but a central part of the GRP cover 9 can be detached to obtain access.

A tent 40 for use with the trailer unit is shown in FIG. 6. Poles 31 drop into the sockets 29, and roof struts 32 bridge the roof of the tent between the poles 31. The outer tent cover is in one piece, and the lower edges thereof are attached to the trailer unit by means of press-putton fasteners 33. This prevents draughts blowing into the tent underneath the bottom edges, and also keeps the tent in place on the trailer unit without the need for any guy ropes. The tent frame is arranged so that it bulges in the middle at 34, and then narrows again towards the bottom. The cover is sewn so that it can be pulled down just over the widest point of the bulge 34, and then zip fasteners provided in the fabric can be done up in order to bring the tapered sides of the tent together. This tapering construction keeps the tent cover in place on the frame. An inner tent 35 can be hung inside the outer tent covering in a known way. However, as an alternative to the known methods staples may be brazed to the roof poles 32, and plastic hooks sewn to the outside of the inner tent can be hooked through these staples to support the inner tent.

As mentioned previously, mountings for a shower unit and/or a toilet may be incorporated on the base of the trailer unit. If the floor is of glass reinforced plastic, some of these fittings, e.g. a shower well, may be molded in As well as the use described here as a tent base, the trailer on its own could be fitted with sides, and then used as a trailer for carrying goods of any sort.

I claim:
1. A camping set comprising:
a caravan body unit,
an integral floor forming part of the body unit,
a towable trailer unit having a wheel base,
a floor on the upper surface of the trailer unit, adapted to receive the body unit thereon,
legs for supporting the body unit when it is not received on the trailer unit floor, jacks are provided to lift the body unit, so that the trailer can be withdrawn from underneath, said jacks contact a ground surface outside of said wheel base of said trailer unit and each jack engages the body unit in two places to improve stability when the body unit is supported only by the jacks, a frame tent, means on the trailer unit for supporting the frame of the tent when erected and detachable legs are provided for supporting the body unit when it has been demounted from the trailer unit, and the jacks have been removed.

2. A camping set as claimed in claim 1 including wheels on which the trailer runs, which wheels are arranged wholly within the width of the trailer unit.

3. A camping set as claimed in claim 1, wherein each leg is adapted to be secured to the body unit by a single fastening member.

4. A camping set as claimed in claim 1, wherein the body unit and the trailer unit are provided with flanged end portions to cooperate in fitting the two respective units together whereby, the flanges of the body unit are fixed to the flanges of the trailer unit to secure the two units together.

* * * * *